United States Patent
Negishi

[11] Patent Number: 5,923,904
[45] Date of Patent: Jul. 13, 1999

[54] LENS FITTED FILM UNIT WITH FILM CARTRIDGE ALIGNMENT REDUCING THICKNESS OF UNIT

[75] Inventor: Kenji Negishi, Kanagawa, Japan

[73] Assignee: Fuji Photo Film Co., Ltd., Kanagawa, Japan

[21] Appl. No.: 08/802,987

[22] Filed: Feb. 21, 1997

[30] Foreign Application Priority Data

Feb. 22, 1996 [JP] Japan ................................... 8-034676

[51] Int. Cl.⁶ .................................................... G03B 17/02
[52] U.S. Cl. ................................................. 396/6; 396/538
[58] Field of Search ............................... 396/6, 440, 535, 396/538, 541

[56] References Cited

U.S. PATENT DOCUMENTS 5,555,063   9/1996   Balling ..................................... 396/538

Primary Examiner—Howard B. Blankenship
Attorney, Agent, or Firm—Young & Thompson

[57] ABSTRACT

A lens fitted film unit having a film cartridge with a flat portion with a film egress/ingress slot, and a light-tight film unit case for receiving therein the film cartridge with the flat portion in alignment with a plane perpendicular to an optical axis of a taking lens of a film unit. This alignment of the flat portion of the film cartridge reduces the thickness of the film unit.

6 Claims, 6 Drawing Sheets

LENS FITTED FILM UNIT WITH FILM CARTRIDGE ALIGNMENT REDUCING THICKNESS OF UNIT

BACKGROUND OF THE INVENTION

1. Field of the Invention

This invention relates to a lens fitted film unit.

2. Description of Related Art

Film cartridges or cartridges used in what is called an advanced photo system (APS) have a built-in spool which is rotated to advance and forward a film strip out of the cartridge. Such a film cartridge is known from, for instance, Japanese Unexamined Patent Publication No. 6-301157. The film cartridge can be put in and taken out of a camera with the entire length of film strip rolled in the cartridge.

One of this APS type film cartridges (which is hereafter referred to as a film cartridge for simplicity) is shown by way of example in FIG. 4. Generally, the film cartridge comprises a cartridge shell 23 and a cartridge spool 24 rotatable inside the cartridge shell 23 in opposite directions to unwind a filmstrip 22 off the cartridge spool 24 and to wind the filmstrip 22 onto the spool 24. The film cartridge further comprises a light block door 27 rotated closed to prevent ambient light from entering the cartridge shell 23 through a film egress/ingress slot 26 and rotated open to permit the filmstrip 22 to move into and out of the cartridge shell through the film egress/ingress slot 26. A door drive mechanism built-in a camera engages an end portion of the light block door 27 exposed to the cartridge exterior for rotating the light block door between closed and open positions when the film cartridge is taken out of and put in the camera, respectively. The cartridge shell 23 is shaped mostly cylindrical to match a roll of the filmstrip 22 and is partially flat.

When using the film cartridge with a conventional still camera, it is recommended to position the cartridge in the camera with the flat portion 23a of the cartridge shell 23 inclined backward at an angle of approximately 4° with respect to an imaginary plane (shown by dotted broken line A in FIG. 6A) which is defined by an exposure aperture perpendicular to an optical axis of the camera, as shown by chained line B in FIG. 6A. The film cartridge inclined backward at an angle of approximately 4° with respect to the plane perpendicular to the camera optical axis takes substantially the best position for permitting the filmstrip 22 to move out of the cartridge shell 23 without being impeded by the light block door 27 and/or edges of the film egress/ingress slot 26. Owing to this cartridge position, the filmstrip 22 is prevented from receiving increased frictional resistance from the light block door 27 and edges of the film egress/ingress slot 26 and/or catching scratches during film movement into and out of the cartridge interior.

In the case where the APS type film cartridge is employed in lens-fitted film units on which a strong demand for miniaturization is made, the best position of the film cartridge is, however, one which causes an increase in thickness of a light-tight film unit case of such a lens fitted film unit. In particular, because the lens-fitted film unit has an exposure aperture defined by film tracks bending backward as shown in FIG. 6B, the filmstrip 22 (shown by chained line C in FIG. 6B) enters the cartridge interior at an angle of approximately 15° with respect to the plane (shown by chained line A in FIG. 6B) perpendicular to an optical axis of the film unit at the film egress/ingress slot 26. Consequently, when positioning the film cartridge in substantially the best position, namely at an angle of 4° with respect to the plane defined by the exposure aperture, the film cartridge must be placed with an inclination of approximately 19° with respect to the plane perpendicular to the optical axis of the film unit, and hence the flat portion 23a shifted backward. In this way, the light-tight film unit case containing the film cartridge placed in the best position is made thicker, decreasing portability which is one of distinctive features of the lens fitted film unit.

As is well known, at the manufacturer, the light-tight film unit case is loaded with a film cartridge with substantially the entire length of unexposed filmstrip prewound simply into a roll in a film roll chamber located on the opposite side of the film cartridge with respect to the exposure aperture. The exposed frame is rewound into the film cartridge after every exposure. Consequently, the photographer is never required to wind the film strip out of the film cartridge. Owing to the necessity of film movement in one direction only, the filmstrip is not scratched even when it makes a strong contact with the light block door and/or edges of the film egress/ingress slots and thus an increase in frictional resistance is not a serious problem to be settled in the lens fitted film unit.

SUMMARY OF THE INVENTION

It is an object of this invention to provide a thin lens fitted film unit for use with an APS type film cartridge which has high portability and is produced at low cost.

Foregoing object of the invention is accomplished by providing a lens fitted film unit, containing a film cartridge has a cartridge shell made up of a cylindrical portion shaped to meet a roll of filmstrip wound around a spool and a flat portion extending from the cylindrical portion in which a film egress/ingress slot is formed, has a film unit case provided with an exposure aperture frame which defines an exposure aperture located between a film cartridge receiving chamber and a film roll receiving chamber and at the back of which a film path extending over across at least the exposure aperture and curved backward is formed. The film cartridge is built in the film cartridge receiving chamber with the flat portion in alignment with a plane perpendicular to an optical axis of a taking lens of the lens fitted film unit.

BRIEF DESCRIPTION OF THE DRAWINGS

The above object of the present invention will be understood from the following description of a specific embodiment thereof when consider in conjunction with the accompanying drawings, in which.

DETAILED DESCRIPTION OF THE SPECIFIC EMBODIMENT

Figure 1:
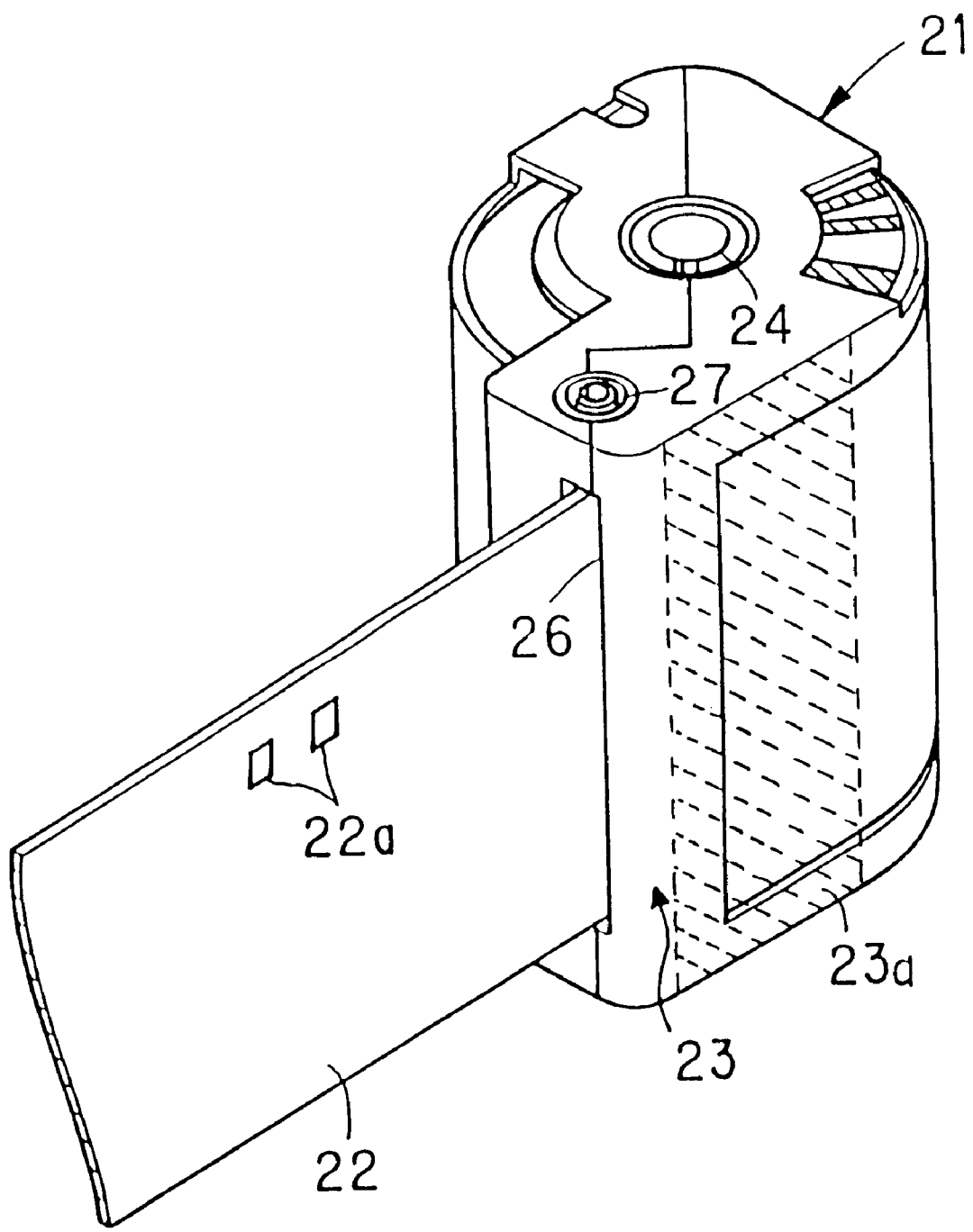
FIG. 1 is a perspective view of a film cartridge used in a lens fitted film unit of the invention.
Figure 2:
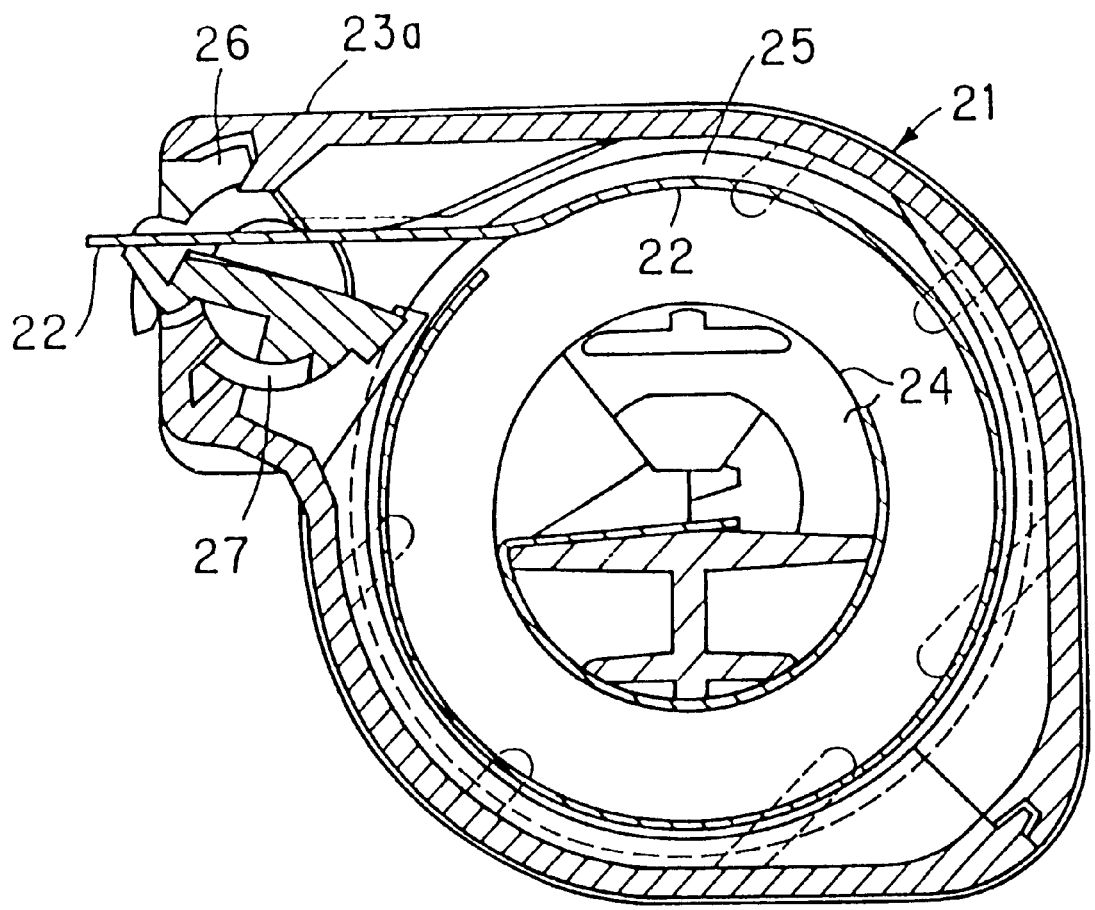
FIG. 2 is a cross-sectional view of the film cartridge shown in FIG. 1.

Referring to the drawings in detail, in particular, to FIGS. 1 and 2 showing an ASP type film cartridge 21 used in a lens fitted film unit of the invention, the film cartridge 21 comprises a light-tight film cartridge shell 23 and a cartridge spool 24 rotatable inside the light-tight film cartridge shell 23 in opposite directions to unwind a filmstrip 22 off the cartridge spool 24 and to rewind the filmstrip 22 onto the spool 24. The cartridge spool 24 at opposite ends is provided with support disks 25 located within the light-tight film cartridge shell 23. The film cartridge 21 further comprises a light block door 27 (only an extreme end portion thereof is shown) rotated closed to prevent ambient light from entering the light-tight film cartridge shell 23 through a film egress/ingress slot 26 and rotated open to permit the filmstrip 22 to move into and out of the light-tight film cartridge shell 23 through the film egress/ingress slot 26. These components of the film cartridge 21 are made of plastic resin materials. A door drive mechanism (not shown) built-in a camera engages an end portion of the light block door 27 exposed to the cartridge exterior for rotating the light block door 27 between closed and open positions when the film cartridge 21 is taken out of and put in the camera, respectively. The light-tight film cartridge shell 23 is shaped mostly cylindrical to match a roll of the filmstrip 22 and is partially flat. The flat portion 23a adjacent the cylindrical portion of the light-tight film cartridge shell 23 is formed with the film egress/ingress slot 26. The filmstrip 22 has a number of perforations 22a, two for each exposure frame (only two of which are shown for simplicity in FIG. 1).

The filmstrip 22 is wound around the cartridge spool 24 within the cartridge interior with its one end fixedly attached to the cartridge spool 27 and both side edges supported by the support disks 25. When the film cartridge 21 is put in the camera, the light block door 27 is automatically rotated open to permit the filmstrip 22 to move into and out of the light-tight film cartridge shell 23 through the film egress/ingress slot 26. On the other hand, when it is removed from the camera, the light block door 27 is rotated closed to prevent ambient light from entering the light-tight film cartridge shell 23 through the film egress/ingress slot 26 and keep the cartridge interior light-tight. As was previously mentioned, the lens fitted film unit is loaded with the film cartridge with substantially the entire length of unexposed filmstrip prewound simply into a roll in a film roll chamber, and hence the filmstrip 22 is only wound into the cartridge interior through the film egress/ingress slot 26 after it is partly exposes or completely exposed.

Figure 3:
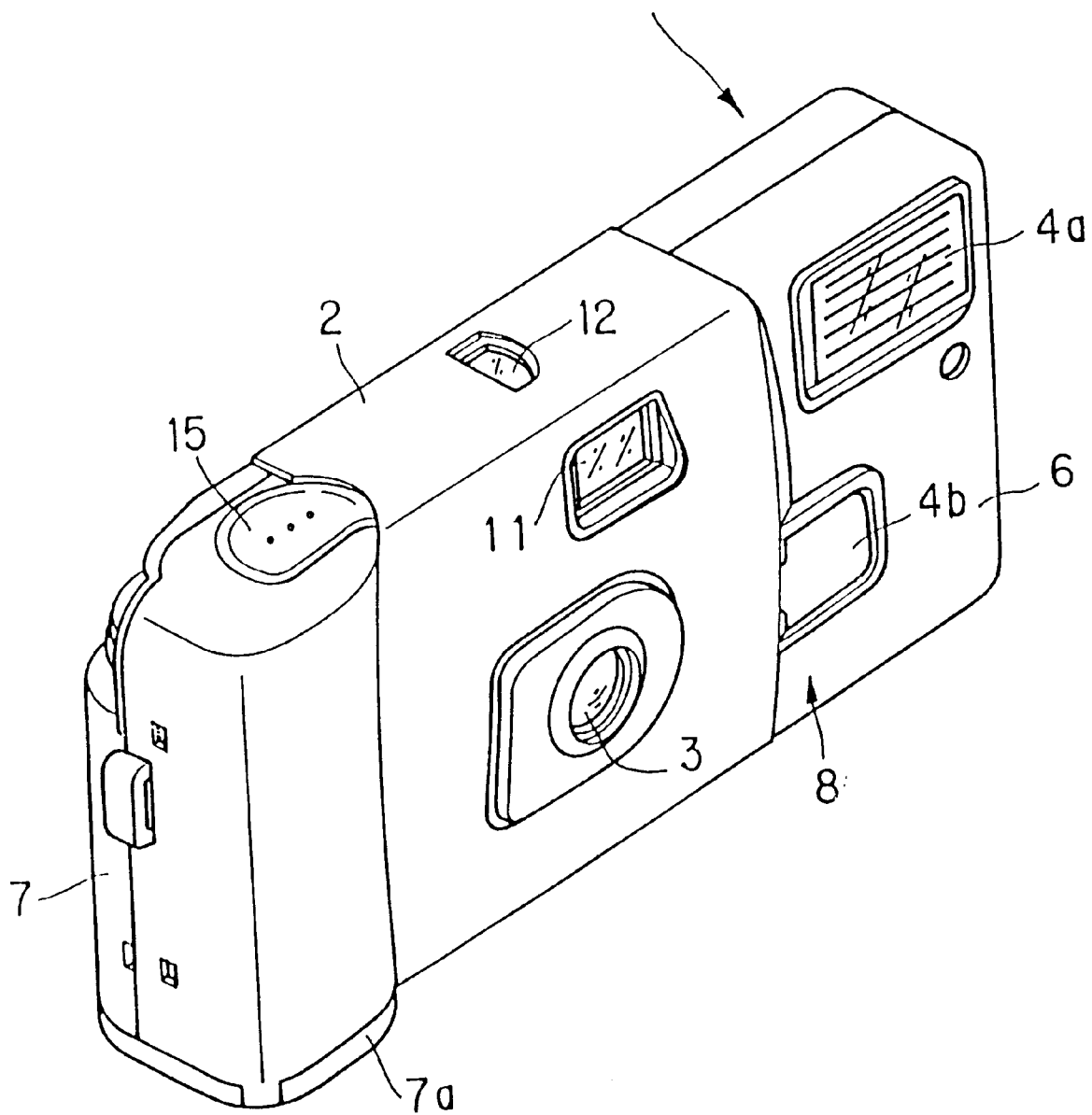
FIG. 3 is a perspective view of a lens fitted film unit in accordance with a specific embodiment of the invention.
Figure 4:
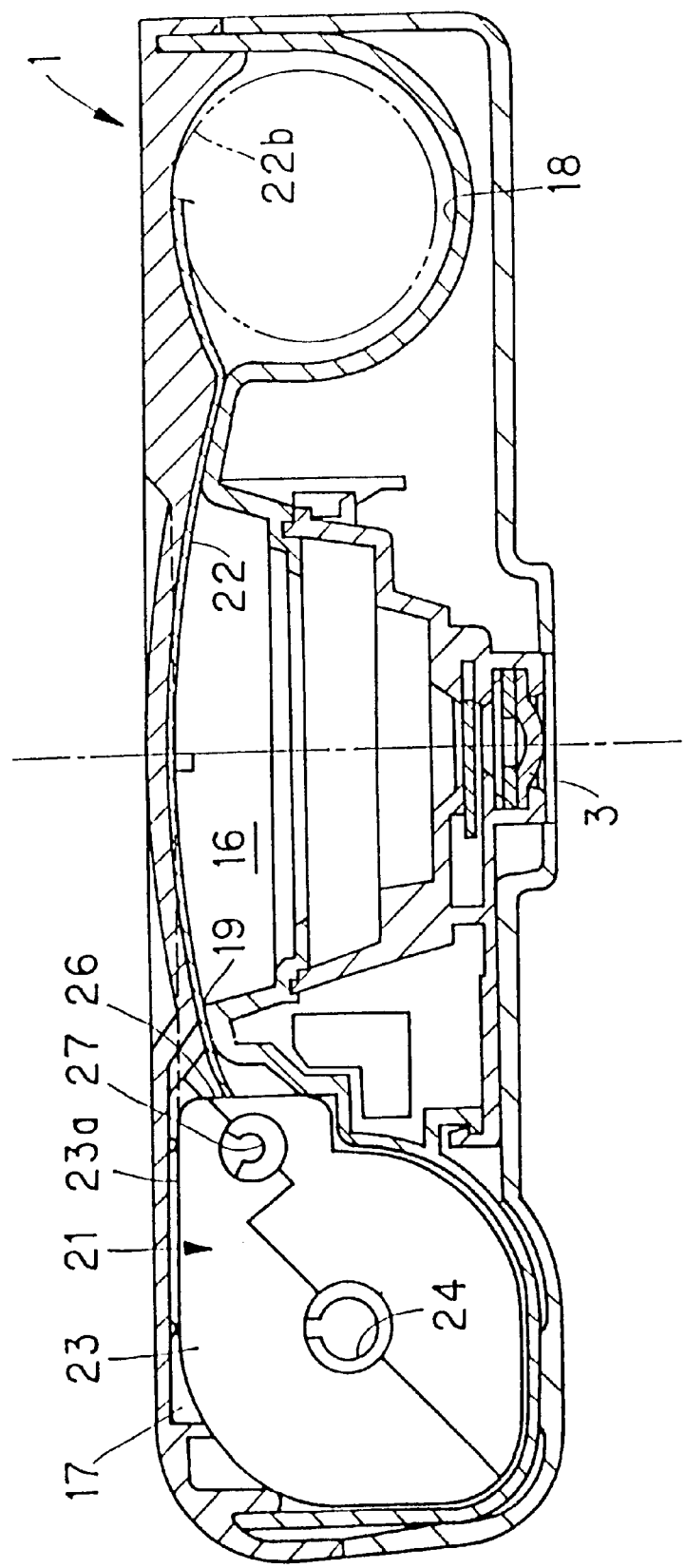
FIG. 4 is a cross-sectional view of the lens fitted film unit shown in FIG. 3.
Figure 5:
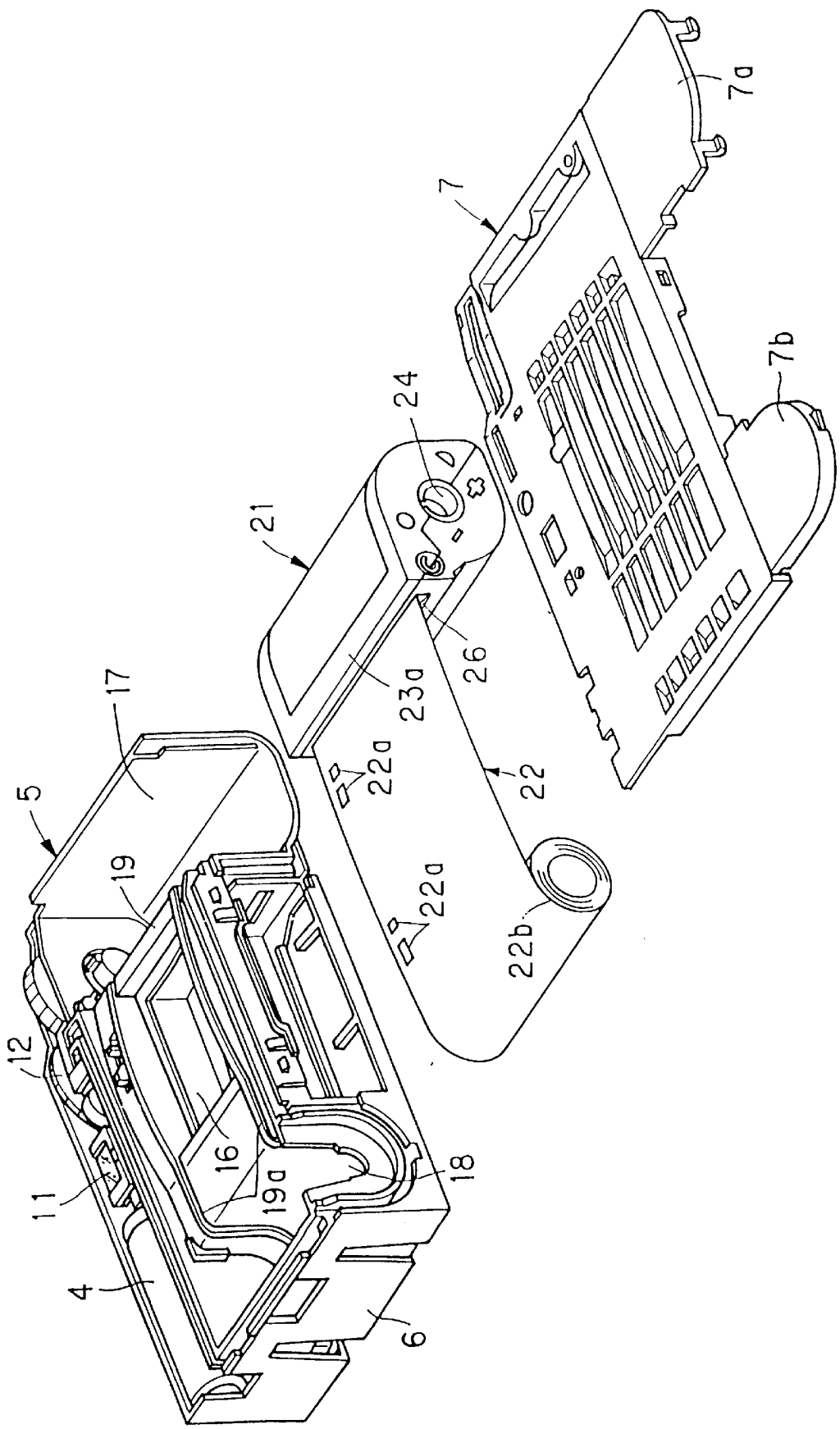
FIG. 5 is a rear exploded perspective view of the lens fitted film unit shown in FIG. 3.
Figure 6A:
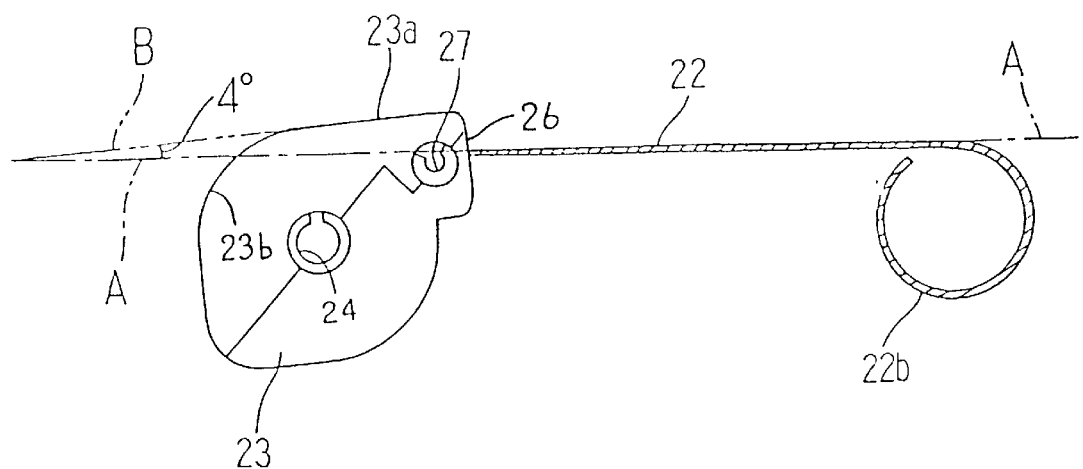
FIGS. 6A and 6B are explanatory illustrations of a conventional film cartridge loaded in a camera.
Figure 6B:
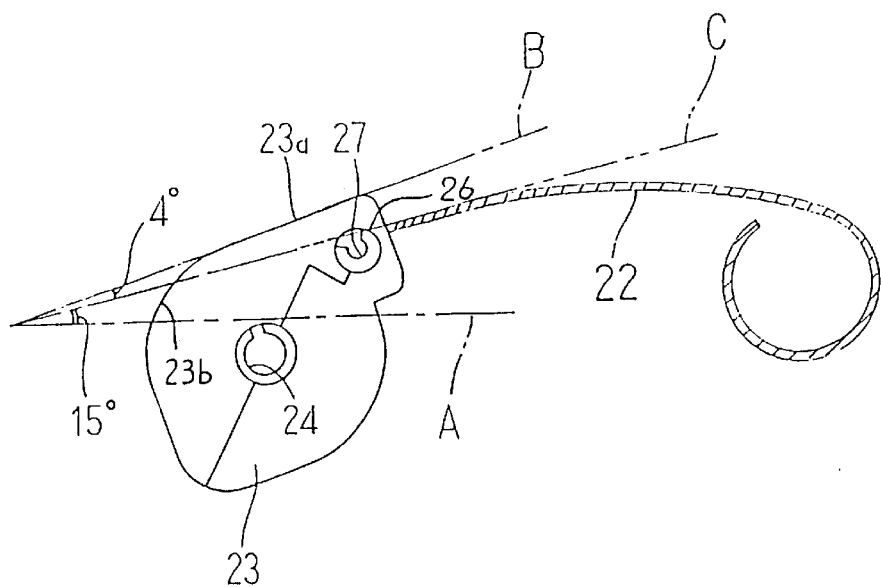

FIGS. 3 through 5 show a lens fitted film unit 1 loaded with the film cartridge 21 with substantially the entire length of unexposed filmstrip 22 prewound simply into a roll in a film roll chamber of the film unit 1 at the manufacturer. The lens fitted film unit 1 comprises a light-tight film unit case 8 made up of three sections, namely a main body section 5 and front and rear cover sections 6 and 7 which are shaped for assembly by means of hook and notch engagement into one light-tight rectangular box. The light-tight film unit case 8 is partly covered by a decorative cover 2 having openings for, for example, a taking lens 3, a view finder window 11, and an exposure counter window 12. The front cover section 6 at its front wall is provided with the taking lens opening, the view finder window 11, a flash window 4a, and a flash source charging switch 4b formed as an integral part thereof. The front cover section 6 at its top wall is further provided with the exposure counter window 12, and a shutter release button 15 formed as an integral part thereof. The main body section 5 at its center is provided to an exposure aperture frame 16 attached with the taking lens 3 and a simple mechanical shutter (not shown), a cartridge receiving chamber 17 for a film cartridge 21 located on one side of the exposure aperture frame 16, a film roll chamber 18 for receiving a roll of prewound unexposed film strip 22 located on another side of the exposure aperture frame 16, and top and bottom film guide tracks 19a formed at the back of the exposure aperture frame 16 which forms a film path 19. The film guide tracks 19a are gently curved backward at a lead angle of approximately 15° to make a film surface curved suitably for correction of the curvature of field of the taking lens 3. The term "lead angle" used in this specification shall mean and refer to an angle of a tangential line to the film surface at each proximate end of the exposure aperture with respect to a plane perpendicular to the optical axis of the taking lens 3. Guiding the filmstrip 22 on the top and bottom film guide tracks 19a provides a reduced frictional resistance during film movement. The cartridge receiving chamber 17 is shaped to place the film cartridge 21 with the flat portion 23a oriented in a direction perpendicular to the optical axis of the taking lens 3. The rear cover 7 has bottom lids, namely a cartridge receiving chamber bottom rid 7a and a film roll receiving chamber bottom lid 7b and is fixedly attached to the back of the main body section 5 to close the cartridge receiving chamber 17, the film roll receiving chamber 18, and the film path 19 light-tightly.

According to the combination of the APS film cartridge 21 and the light-tight film unit case 8, because the film cartridge 21 is received in the film unit case 8 with the flat portion 23a adjacent to the cylindrical portion 23b of the film cartridge shell 23 in alignment with a plane perpendicular to the optical axis of the taking lens 3, the thickness of the film cartridge 21 in the direction of the optical axis of the taking lens 3, when put in the film unit case 8, is substantially the same as the diameter of the cylindrical portion 23a, making the lens fitted film unit 1 thin.

After the photographer takes a picture, the filmstrip 22 is automatically, or otherwise manually, rewound out of the film roll receiving chamber 18 and into the film cartridge 21 in the film cartridge receiving chamber 17 frame by frame. Differently from general cameras, the lens fitted film unit 1 needs to unwind the filmstrip 22 out of the film roll receiving chamber 18 and wind it onto the cartridge spool 24 of the film cartridge 21 within the film cartridge receiving chamber 17, and needs not to unwind the filmstrip 22 out of the film cartridge 21. Consequently, even if the filmstrip 22 encounters somewhat a strong contact with the light block door 27 and/or edges of the film egress/ingress slot 26 due to placing the film cartridge 21 without any inclination with respect to a plane perpendicular to the optical axis of the taking lens 3, the filmstrip 22 does not catch scratches and, because the filmstrip 22 is moved only in such a direction as to be under tension, an increase in frictional resistance due to placing the film cartridge 21 without any inclination with respect to a plane perpendicular to the optical axis of the taking lens 3 is not a serious problem. Furthermore, placing the film cartridge 21 without any inclination with respect to a plane perpendicular to the optical axis of the taking lens 3 places the filmstrip 22 under tension, preventing the filmstrip 22 from undesirable movement in the film path 19 due to vibrations of the lens fitted film unit 1.

It is to be understood that the present invention may be embodied with various changes, modifications and improvements, which may occur to those skilled in the art, without departing from the spirit and scope of the invention defined in the following claims.

What is claimed is:

1. A lens fitted film unit, comprising
    a film cartridge having a cartridge shell made up of a cylindrical portion shaped to meet a roll of filmstrip wound around a spool and a flat portion extending from the cylindrical portion, the flat portion being immediately adjacent to a film egress/ingress slot; and a light-tight film unit case having a film cartridge receiving chamber located at one extreme end of said film unit case, said film cartridge receiving chamber being shaped to place said film cartridge with said flat portion defining a plane perpendicular to an optical axis of a taking lens of said film unit, a film roll receiving chamber located at another extreme end of said film unit case for receiving therein said film strip rewound from said film cartridge into a roll, an exposure aperture frame which defines an exposure aperture located between said film cartridge receiving chamber and said film roll receiving chamber and a film path curved backward and extending across at least said exposure aperture.

2. A lens fitted film unit as defined in claim 1, wherein said exposure aperture frame comprises at least film guide tracks located at top and bottom sides of said exposure aperture, said film guide tracks being curved with a concave side facing the taking lens.

3. A lens fitted film unit as defined in claim 2, wherein an angle between a tangential line to each said film guide track at each proximate end of said exposure aperture and said perpendicular plane is approximately 15°.

4. A lens fitted film unit comprising a film cartridge has a cartridge shell made up of a cylindrical portion in which a spool is installed to rotate in opposite directions to unwind a filmstrip out of said film cartridge and to wind said filmstrip into said film cartridge, respectively, and a flat portion extending tangentially from said cylindrical portion, a film egress/ingress slot disposed immediately adjacent to said flat portion, and a light-tight film unit case loaded with said film cartridge, said film unit case comprising:

a main body section provided with a film cartridge receiving chamber located at one extreme end of said film unit case, said film cartridge receiving chamber being shaped to place said film cartridge with said flat portion defining a plane perpendicular to an optical axis of a taking lens of said film unit, a film roll receiving chamber located at another extreme end of said film unit case for receiving therein said filmstrip rewound from said film cartridge into a roll, and an exposure aperture frame which defines an exposure aperture located between said film cartridge receiving chamber and said film roll receiving chamber and is curved backward and extends across at least said exposure aperture to form a film path at the back thereof; and a rear cover section secured to said main body section to close light-tightly said exposure aperture, said film cartridge receiving chamber and said film roll receiving chamber.

5. A lens fitted film unit as defined in claim 4, wherein said exposure aperture frame comprises at least film guide tracks located at top and bottom sides of said exposure aperture, said film guide tracks being curved with a concave side facing the taking lens.

6. A lens fitted film unit as defined in claim 5, wherein an angle between a tangential line to each said film guide track at each proximate end of said exposure aperture and said perpendicular plane is approximately 15°.

* * * * *